United States Patent
Vogel, Jr. et al.

(10) Patent No.: US 8,060,623 B2
(45) Date of Patent: Nov. 15, 2011

(54) AUTOMATED CONFIGURATION OF NETWORK DEVICE PORTS

(75) Inventors: Gary Dennis Vogel, Jr., Sunnyvale, CA (US); Roland Saville, Oakland Park, FL (US); Ralph Droms, Boxborough, MA (US); Vikas Butaney, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 936 days.

(21) Appl. No.: 11/104,140

(22) Filed: Apr. 11, 2005

(65) Prior Publication Data

US 2005/0264420 A1     Dec. 1, 2005

Related U.S. Application Data

(60) Provisional application No. 60/570,999, filed on May 13, 2004.

(51) Int. Cl.
G06F 15/177 (2006.01)
G06F 15/173 (2006.01)
G06F 15/16 (2006.01)
H04L 12/28 (2006.01)
H04L 12/56 (2006.01)

(52) U.S. Cl. ........ 709/228; 709/220; 709/221; 709/222; 709/223; 709/224; 709/225; 709/226; 370/401

(58) Field of Classification Search .................. 370/401; 709/220–222, 223–226, 228
See application file for complete search history.

(56) References Cited

U.S. PATENT DOCUMENTS

| 4,625,081 | A | 11/1986 | Lotito et al. |
| 4,688,026 | A | 8/1987 | Scribner et al. |
| 5,339,073 | A | 8/1994 | Dodd et al. |
| 5,574,722 | A | 11/1996 | Slykhouse et al. |
| 5,588,009 | A | 12/1996 | Will |
| 5,646,616 | A | 7/1997 | Komatsu |
| 5,790,542 | A | 8/1998 | Kim et al. |
| 5,796,743 | A | 8/1998 | Bunting et al. |
| 5,819,042 | A | 10/1998 | Hansen |
| 5,832,503 | A | 11/1998 | Malik et al. |
| 5,850,187 | A | 12/1998 | Carrender et al. |

(Continued)

FOREIGN PATENT DOCUMENTS

EP     01217804     6/2002

(Continued)

OTHER PUBLICATIONS

R.Droms, Dynamic Host Configuration Protocol: Request for Comments (RFC) 2131, Bucknell University, Mar. 1997, p. 2, 15-16, 26.*

(Continued)

*Primary Examiner* — Kevin Bates
*Assistant Examiner* — Angela Nguyen
(74) *Attorney, Agent, or Firm* — Weaver Austin Villeneuve & Sampson LLP

(57) ABSTRACT

Methods and devices are provided for identifying end devices and automatically configuring associated network settings. Preferred implementations of the invention do not require users to manually identify connection types (e.g., RFID, IPphone, manufacturing device, etc.) or to manually configure the network device. Accordingly, such implementations allow automatic switch configuration, even for devices that use inconsistent protocols and/or protocols that are not well known. Some methods of the invention employ DHCP options combined with traffic snooping to identify devices and automatically apply appropriate switch port configuration.

20 Claims, 8 Drawing Sheets

U.S. PATENT DOCUMENTS

| | | |
|---|---|---|
| 5,887,176 A | 3/1999 | Griffith et al. |
| 6,012,090 A | 1/2000 | Chung et al. |
| 6,021,135 A | 2/2000 | Ishihara et al. |
| 6,070,187 A * | 5/2000 | Subramaniam et al. ....... 709/220 |
| 6,111,517 A | 8/2000 | Atick et al. |
| 6,115,079 A | 9/2000 | McRae |
| 6,115,378 A | 9/2000 | Hendel et al. |
| 6,125,391 A | 9/2000 | Meltzer et al. |
| 6,145,079 A | 11/2000 | Mitty et al. |
| 6,212,563 B1 | 4/2001 | Beser |
| 6,226,675 B1 | 5/2001 | Meltzer et al. |
| 6,300,903 B1 | 10/2001 | Richards et al. |
| 6,321,264 B1 | 11/2001 | Fletcher et al. |
| 6,324,575 B1 * | 11/2001 | Jain et al. ..................... 709/221 |
| 6,330,597 B2 * | 12/2001 | Collin et al. .................. 709/220 |
| 6,337,856 B1 | 1/2002 | Schanhals et al. |
| 6,341,130 B1 | 1/2002 | Lakshman et al. |
| 6,356,951 B1 | 3/2002 | Gentry |
| 6,363,477 B1 | 3/2002 | Fletcher et al. |
| 6,393,458 B1 | 5/2002 | Gigliotti et al. |
| 6,473,858 B1 | 10/2002 | Shimomura et al. |
| 6,510,434 B1 | 1/2003 | Anderson et al. |
| 6,510,464 B1 | 1/2003 | Grantges et al. |
| 6,539,281 B2 | 3/2003 | Wan et al. |
| 6,553,489 B1 | 4/2003 | Osler et al. |
| 6,587,431 B1 | 7/2003 | Almulhem et al. |
| 6,587,874 B1 | 7/2003 | Golla et al. |
| 6,597,918 B1 | 7/2003 | Kim |
| 6,611,526 B1 | 8/2003 | Chinnaswamy et al. |
| 6,665,713 B1 | 12/2003 | Hada et al. |
| 6,677,852 B1 | 1/2004 | Landt et al. |
| 6,678,827 B1 | 1/2004 | Rothermel et al. |
| 6,683,881 B1 | 1/2004 | Mijares et al. |
| 6,718,326 B2 | 4/2004 | Uga et al. |
| 6,745,041 B2 | 6/2004 | Allison et al. |
| 6,772,204 B1 | 8/2004 | Hansen et al. |
| 6,772,211 B2 | 8/2004 | Lu et al. |
| 6,772,223 B1 | 8/2004 | Corl, Jr. et al. |
| 6,785,732 B1 | 8/2004 | Bates et al. |
| 6,792,002 B2 | 9/2004 | Tezuka et al. |
| 6,810,040 B1 | 10/2004 | Lee et al. |
| 6,816,455 B2 | 11/2004 | Goldberg et al. |
| 6,843,121 B1 | 1/2005 | DeBar et al. |
| 6,862,270 B1 | 3/2005 | Ho |
| 6,868,426 B1 | 3/2005 | Mankoff |
| 6,912,213 B2 | 6/2005 | Kim |
| 6,931,574 B1 | 8/2005 | Coupal et al. |
| 6,963,282 B1 | 11/2005 | Yeates et al. |
| 6,965,599 B1 | 11/2005 | Sakurai et al. |
| 6,995,655 B2 | 2/2006 | Ertin et al. |
| 6,996,842 B2 | 2/2006 | Strahm et al. |
| 7,002,907 B1 | 2/2006 | Chen et al. |
| 7,032,031 B2 | 4/2006 | Jungck et al. |
| 7,038,573 B2 | 5/2006 | Bann |
| 7,054,924 B1 | 5/2006 | Harvey et al. |
| 7,057,511 B2 | 6/2006 | Shanks et al. |
| 7,058,973 B1 | 6/2006 | Sultan |
| 7,064,660 B2 | 6/2006 | Perkins et al. |
| 7,075,412 B1 | 7/2006 | Reynolds et al. |
| 7,081,819 B2 | 7/2006 | Martinez de Velasco Cortina et al. |
| 7,089,586 B2 | 8/2006 | Kilgore |
| 7,103,040 B2 | 9/2006 | Aalbers et al. |
| 7,103,886 B2 | 9/2006 | Haller et al. |
| 7,111,076 B2 | 9/2006 | Abjanic et al. |
| 7,111,163 B1 | 9/2006 | Haney |
| 7,114,008 B2 | 9/2006 | Jungck et al. |
| 7,120,139 B1 | 10/2006 | Kung et al. |
| 7,126,907 B2 | 10/2006 | Carpini et al. |
| 7,129,837 B2 | 10/2006 | Shannon et al. |
| 7,134,075 B2 | 11/2006 | Hind et al. |
| 7,149,222 B2 | 12/2006 | Wiryaman et al. |
| 7,165,722 B2 | 1/2007 | Shafer et al. |
| 7,177,915 B2 | 2/2007 | Kopchik |
| 7,178,729 B2 | 2/2007 | Shaffer et al. |
| 7,185,365 B2 | 2/2007 | Tang et al. |
| 7,205,897 B2 | 4/2007 | Lin |
| 7,213,768 B2 | 5/2007 | Patel et al. |
| 7,215,637 B1 | 5/2007 | Ferguson et al. |
| 7,215,641 B1 | 5/2007 | Bechtolsheim et al. |
| 7,221,660 B1 | 5/2007 | Simonson et al. |
| 7,239,634 B1 | 7/2007 | Chakravorty |
| 7,242,303 B2 | 7/2007 | Patel et al. |
| 7,245,620 B2 | 7/2007 | Shankar |
| 7,249,170 B2 | 7/2007 | Tindal et al. |
| 7,260,115 B1 | 8/2007 | DeFord |
| 7,296,268 B2 | 11/2007 | Darling et al. |
| 7,299,361 B1 | 11/2007 | Kim et al. |
| 7,321,556 B1 | 1/2008 | Parekh et al. |
| 7,322,523 B2 | 1/2008 | Howarth et al. |
| 7,323,988 B2 | 1/2008 | Krstulich |
| 7,325,734 B2 | 2/2008 | Howarth et al. |
| 7,330,908 B2 | 2/2008 | Jungck |
| 7,333,001 B2 | 2/2008 | Lane et al. |
| 7,333,479 B2 | 2/2008 | Jalkanen et al. |
| 7,336,175 B2 | 2/2008 | Howarth et al. |
| 7,345,585 B2 | 3/2008 | Singhal et al. |
| 7,362,763 B2 | 4/2008 | Wybenga et al. |
| 7,363,353 B2 | 4/2008 | Ganesan et al. |
| 7,376,755 B2 | 5/2008 | Pandya |
| 7,394,381 B2 | 7/2008 | Hanson et al. |
| 7,411,501 B2 | 8/2008 | Austin |
| 7,411,915 B1 | 8/2008 | Spain et al. |
| 7,415,512 B1 | 8/2008 | Moon |
| 7,421,695 B2 | 9/2008 | Murray et al. |
| 7,422,152 B2 | 9/2008 | Howarth et al. |
| 7,437,451 B2 | 10/2008 | Tang et al. |
| 7,446,657 B2 | 11/2008 | Shaffer et al. |
| 7,568,015 B2 | 7/2009 | Wang et al. |
| 7,593,427 B1 * | 9/2009 | Wongsonegoro et al. .... 370/470 |
| 7,648,070 B2 | 1/2010 | Droms et al. |
| 2001/0012292 A1 | 8/2001 | Merrill et al. |
| 2001/0028308 A1 | 10/2001 | De La Huerga |
| 2001/0047422 A1 | 11/2001 | McTernan et al. |
| 2002/0001307 A1 | 1/2002 | Nguyen et al. |
| 2002/0014964 A1 | 2/2002 | Okamura |
| 2002/0015485 A1 | 2/2002 | Bhusri |
| 2002/0016739 A1 | 2/2002 | Ogasawara |
| 2002/0046263 A1 | 4/2002 | Camerini et al. |
| 2002/0069279 A1 | 6/2002 | Romero et al. |
| 2002/0075805 A1 | 6/2002 | Gupta et al. |
| 2002/0105911 A1 | 8/2002 | Pruthi et al. |
| 2002/0107951 A1 | 8/2002 | Teague et al. |
| 2002/0126672 A1 | 9/2002 | Chow et al. |
| 2002/0136403 A1 | 9/2002 | Henson et al. |
| 2002/0143981 A1 | 10/2002 | DeLima et al. |
| 2002/0161907 A1 | 10/2002 | Moon |
| 2002/0163933 A1 | 11/2002 | Benveniste |
| 2002/0165957 A1 | 11/2002 | Devoe et al. |
| 2002/0191622 A1 | 12/2002 | Zdan |
| 2002/0194342 A1 | 12/2002 | Lu et al. |
| 2002/0194345 A1 | 12/2002 | Lu et al. |
| 2002/0194350 A1 | 12/2002 | Lu et al. |
| 2003/0005117 A1 | 1/2003 | Kang et al. |
| 2003/0009571 A1 | 1/2003 | Bavadekar |
| 2003/0018726 A1 | 1/2003 | Low et al. |
| 2003/0026268 A1 | 2/2003 | Navas |
| 2003/0028599 A1 | 2/2003 | Kolsky |
| 2003/0028616 A1 | 2/2003 | Aoki et al. |
| 2003/0036897 A1 | 2/2003 | Flores et al. |
| 2003/0046339 A1 | 3/2003 | Ip |
| 2003/0046429 A1 | 3/2003 | Sonksen |
| 2003/0055818 A1 | 3/2003 | Faybihenko et al. |
| 2003/0065784 A1 | 4/2003 | Herrod |
| 2003/0069975 A1 | 4/2003 | Abjanic et al. |
| 2003/0078031 A1 | 4/2003 | Masuda |
| 2003/0093530 A1 | 5/2003 | Syed |
| 2003/0095032 A1 | 5/2003 | Hoshino et al. |
| 2003/0095569 A1 | 5/2003 | Wengrovitz et al. |
| 2003/0105903 A1 | 6/2003 | Garnett et al. |
| 2003/0112802 A1 | 6/2003 | Ono et al. |
| 2003/0112809 A1 | 6/2003 | Bharali et al. |
| 2003/0115448 A1 | 6/2003 | Bouchard |
| 2003/0120384 A1 | 6/2003 | Haitin et al. |
| 2003/0126248 A1 * | 7/2003 | Chambers ..................... 709/223 |
| 2003/0140140 A1 | 7/2003 | Lahtinen |

| | | |
|---|---|---|
| 2003/0163539 A1 | 8/2003 | Piccinelli |
| 2003/0163603 A1 | 8/2003 | Fry et al. |
| 2003/0174714 A1 | 9/2003 | Manik et al. |
| 2003/0177183 A1 | 9/2003 | Cabrera et al. |
| 2003/0177374 A1 | 9/2003 | Yung et al. |
| 2003/0188192 A1 | 10/2003 | Tang et al. |
| 2003/0189935 A1 | 10/2003 | Warden et al. |
| 2003/0202535 A1 | 10/2003 | Foster et al. |
| 2003/0204626 A1 | 10/2003 | Wheeler |
| 2003/0204719 A1 | 10/2003 | Ben-Itzhak |
| 2003/0217171 A1 | 11/2003 | Von Stuermer et al. |
| 2003/0217176 A1 | 11/2003 | Beunings |
| 2003/0226887 A1 | 12/2003 | Komine et al. |
| 2003/0236883 A1 | 12/2003 | Takeshima et al. |
| 2004/0001444 A1 | 1/2004 | Sadot et al. |
| 2004/0006613 A1 | 1/2004 | Lemieus et al. |
| 2004/0010594 A1 | 1/2004 | Boyd et al. |
| 2004/0021569 A1 | 2/2004 | Lepkofker et al. |
| 2004/0022250 A1 | 2/2004 | Chen et al. |
| 2004/0022255 A1 | 2/2004 | Chen et al. |
| 2004/0024868 A1 | 2/2004 | Drummond |
| 2004/0032881 A1 | 2/2004 | Arai |
| 2004/0039940 A1 | 2/2004 | Cox et al. |
| 2004/0054886 A1 | 3/2004 | Dickinson et al. |
| 2004/0061646 A1 | 4/2004 | Andrews et al. |
| 2004/0064577 A1 | 4/2004 | Dahlin et al. |
| 2004/0069852 A1 | 4/2004 | Seppinen et al. |
| 2004/0073600 A1* | 4/2004 | Elo et al. ............ 709/201 |
| 2004/0088460 A1 | 5/2004 | Poisner |
| 2004/0088585 A1 | 5/2004 | Kaler et al. |
| 2004/0100383 A1 | 5/2004 | Chen et al. |
| 2004/0108795 A1 | 6/2004 | Meek et al. |
| 2004/0121789 A1 | 6/2004 | Lindsey |
| 2004/0128389 A1 | 7/2004 | Kopchik |
| 2004/0133775 A1 | 7/2004 | Callas et al. |
| 2004/0136371 A1 | 7/2004 | Muralidhar et al. |
| 2004/0145474 A1 | 7/2004 | Schmidtberg et al. |
| 2004/0162871 A1 | 8/2004 | Pabla et al. |
| 2004/0167986 A1 | 8/2004 | Gilfix et al. |
| 2004/0170182 A1 | 9/2004 | Higashida et al. |
| 2004/0205336 A1 | 10/2004 | Kessler et al. |
| 2004/0205770 A1 | 10/2004 | Zhang et al. |
| 2004/0221319 A1 | 11/2004 | Zenoni |
| 2004/0257202 A1 | 12/2004 | Coughlin et al. |
| 2004/0259557 A1 | 12/2004 | Bey |
| 2004/0267920 A1 | 12/2004 | Hydrie et al. |
| 2004/0267933 A1 | 12/2004 | Przybylski et al. |
| 2005/0005031 A1 | 1/2005 | Gordy et al. |
| 2005/0015619 A1 | 1/2005 | Lee |
| 2005/0021626 A1 | 1/2005 | Prajapat et al. |
| 2005/0021836 A1 | 1/2005 | Reed et al. |
| 2005/0025091 A1 | 2/2005 | Patel et al. |
| 2005/0027778 A1 | 2/2005 | Dimitrelis et al. |
| 2005/0041670 A1 | 2/2005 | Lin et al. |
| 2005/0050362 A1 | 3/2005 | Peles |
| 2005/0054346 A1 | 3/2005 | Windham et al. |
| 2005/0060208 A1 | 3/2005 | Gianantoni |
| 2005/0063377 A1 | 3/2005 | Bryant et al. |
| 2005/0071508 A1 | 3/2005 | Brown et al. |
| 2005/0076332 A1 | 4/2005 | Jawaharlal et al. |
| 2005/0080881 A1* | 4/2005 | Voorhees et al. ............ 709/220 |
| 2005/0080914 A1 | 4/2005 | Lerner et al. |
| 2005/0093679 A1 | 5/2005 | Zai et al. |
| 2005/0094611 A1 | 5/2005 | Cheong et al. |
| 2005/0099270 A1 | 5/2005 | Diorio et al. |
| 2005/0102393 A1 | 5/2005 | Murray et al. |
| 2005/0102406 A1* | 5/2005 | Moon ............ 709/228 |
| 2005/0114394 A1 | 5/2005 | Kaipa et al. |
| 2005/0117576 A1 | 6/2005 | McDysan et al. |
| 2005/0165828 A1 | 7/2005 | Lango et al. |
| 2005/0169171 A1 | 8/2005 | Cheng et al. |
| 2005/0188103 A1 | 8/2005 | Chen |
| 2005/0199716 A1 | 9/2005 | Shafer et al. |
| 2005/0209947 A1 | 9/2005 | Shafer |
| 2005/0213591 A1 | 9/2005 | Nakazawa et al. |
| 2005/0216727 A1 | 9/2005 | Chattopadhyay et al. |
| 2005/0228887 A1* | 10/2005 | Wang et al. ............ 709/227 |
| 2005/0228893 A1 | 10/2005 | Devarapalli et al. |
| 2005/0229243 A1 | 10/2005 | Svendsen et al. |
| 2005/0252957 A1 | 11/2005 | Howarth et al. |
| 2005/0252970 A1 | 11/2005 | Howarth et al. |
| 2005/0252971 A1 | 11/2005 | Howarth et al. |
| 2005/0253717 A1 | 11/2005 | Howarth et al. |
| 2005/0253718 A1 | 11/2005 | Droms et al. |
| 2005/0253722 A1 | 11/2005 | Droms et al. |
| 2005/0286461 A1 | 12/2005 | Zhang et al. |
| 2006/0005035 A1 | 1/2006 | Coughlin |
| 2006/0010086 A1 | 1/2006 | Klein |
| 2006/0021010 A1 | 1/2006 | Atkins et al. |
| 2006/0022801 A1 | 2/2006 | Husak et al. |
| 2006/0031374 A1 | 2/2006 | Lu et al. |
| 2006/0033606 A1 | 2/2006 | Howarth et al. |
| 2006/0044111 A1 | 3/2006 | Kollar et al. |
| 2006/0047464 A1 | 3/2006 | Kumar et al. |
| 2006/0053234 A1 | 3/2006 | Kumar et al. |
| 2006/0071790 A1 | 4/2006 | Duron et al. |
| 2006/0091999 A1 | 5/2006 | Howarth |
| 2006/0106941 A1 | 5/2006 | Singhal et al. |
| 2006/0123226 A1 | 6/2006 | Kumar et al. |
| 2006/0123425 A1 | 6/2006 | Ramarao et al. |
| 2006/0123467 A1 | 6/2006 | Kumar et al. |
| 2006/0123477 A1 | 6/2006 | Raghavan et al. |
| 2006/0123479 A1 | 6/2006 | Kumar et al. |
| 2006/0129650 A1 | 6/2006 | Ho et al. |
| 2006/0129689 A1 | 6/2006 | Ho et al. |
| 2006/0132304 A1 | 6/2006 | Cabell |
| 2006/0143318 A1 | 6/2006 | Prajapat et al. |
| 2006/0146879 A1 | 7/2006 | Anthias et al. |
| 2006/0155862 A1 | 7/2006 | Kathi et al. |
| 2006/0155969 A1 | 7/2006 | Yoda et al. |
| 2006/0167975 A1 | 7/2006 | Chan et al. |
| 2006/0168334 A1 | 7/2006 | Potti et al. |
| 2006/0192001 A1 | 8/2006 | Shaffer et al. |
| 2006/0208063 A1 | 9/2006 | Patel et al. |
| 2006/0208885 A1 | 9/2006 | Lin |
| 2006/0208888 A1 | 9/2006 | Patel et al. |
| 2006/0208889 A1 | 9/2006 | Shaffer et al. |
| 2006/0236062 A1 | 10/2006 | Boss et al. |
| 2006/0248225 A1 | 11/2006 | Batz et al. |
| 2006/0253590 A1 | 11/2006 | Nagy et al. |
| 2006/0256768 A1 | 11/2006 | Chan |
| 2006/0259183 A1* | 11/2006 | Hayes et al. ............ 700/221 |
| 2006/0266832 A1 | 11/2006 | Howarth et al. |
| 2006/0280181 A1 | 12/2006 | Brailas et al. |
| 2007/0013518 A1 | 1/2007 | Howarth |
| 2007/0027966 A1 | 2/2007 | Singhal et al. |
| 2007/0055864 A1 | 3/2007 | Tock et al. |
| 2007/0080784 A1 | 4/2007 | Kim et al. |
| 2007/0109100 A1 | 5/2007 | Jett et al. |
| 2007/0112574 A1 | 5/2007 | Greene |
| 2007/0229274 A1 | 10/2007 | Patel et al. |
| 2007/0258048 A1 | 11/2007 | Pitchers |
| 2007/0283001 A1 | 12/2007 | Spiess et al. |
| 2008/0087730 A1 | 4/2008 | Howarth et al. |
| 2008/0104209 A1 | 5/2008 | Singhal et al. |
| 2008/0136599 A1 | 6/2008 | Sugano et al. |
| 2009/0049191 A1* | 2/2009 | Tolliver ............ 709/238 |
| 2010/0094945 A1 | 4/2010 | Chan et al. |

FOREIGN PATENT DOCUMENTS

| | | |
|---|---|---|
| EP | 1355448 | 10/2003 |
| EP | 1376456 | 1/2004 |
| GB | 2365662 | 2/2002 |
| WO | WO98-26530 | 6/1998 |
| WO | WO02-27507 | 4/2002 |
| WO | WO 03/021465 A1 | 3/2003 |
| WO | WO2004-012424 | 2/2004 |
| WO | WO2005-114604 | 5/2005 |
| WO | WO2005-060208 | 6/2005 |
| WO | WO2005-114545 | 12/2005 |
| WO | WO2005-114602 | 12/2005 |
| WO | WO2005-114603 | 12/2005 |
| WO | WO2006-073804 | 12/2005 |
| WO | WO2006-055406 | 5/2006 |
| WO | WO2006-057852 | 6/2006 |
| WO | WO2006-062814 | 6/2006 |
| WO | WO2006-063002 | 6/2006 |
| WO | WO2006-073740 | 7/2006 |

| WO | WO2007-011591 | 7/2006 |
| WO | WO2007-002334 | 1/2007 |
| WO | WO2008-016488 | 2/2008 |

OTHER PUBLICATIONS

US Office Action mailed Mar. 22, 2007 from (related) U.S. Appl. No. 10/866,506.

US Office Action mailed Apr. 4, 2007 from (related) U.S. Appl. No. 10/866,285.

US Office Action mailed Jun. 18, 2007 from (related) U.S. Appl. No. 11/010,089.

"EPC™ Tag Data Standards Version 1.1 Rev.1.24", EPCglobal, Standard Specification, Apr. 1, 2004, 78 pages.

"The Global Language of Business", Retrieved from the internet: http://www.ean-int.org/locations.html, [Retrieved Mar. 24, 2005], 5 pages.

"Cisco Application-Oriented Networking: A Network-Based Intelligent Message Routing System", http://www.cisco.com/en/US/products/ps6438/products_data_sheet0900aecd802clf9c.html Data Sheet, Cisco Systems, Inc., Jul. 13, 2005, pp. 1-7.

"Cisco Catalyst 6500 Series Application-Oriented Networking Module", http://www.cisco.com/en/US/products/ps6438/products_data_sheet0900aecd802c1fe9.html Data Sheet, Cisco Systems, Inc. Jul. 13, 2005, pp. 1-3.

"Cisco Application-Oriented Networking—A Network Embedded Intelligent Message Routing System", http://www.cisco.com/en/US/products/ps6438/prod_bulletin0900aecd802c201b.html Product Bulletin No. 2886, Cisco Systems, Inc. Jul. 13, 2005, pp. 1-3.

"Cisco Catalyst 6500 Series Application—Oriented Networking Module: Large Photo", Photo, Retrieved from the internet: http://www.cisco.com/en/US/products/ps6448/prod_view_selector.html [Retrieved Jul. 13, 2005], Cisco Systems, Inc. 1 page.

"The EPCglobal Architecture Framework" EPCglobal Final Version of Jul. 1, 2005, pp. 1-53.

Marc Girardot and Neel Sundaresan. "Millau: an encoding format for efficient representation and exchange of XML over the web" [Retrieved Jan. 31, 2005]. Retrieved from the internet: http://www9.org/w9cdrom/154/154.html 25 pages.

Fujitsu Limited, et al., "Web Services Reliability (WS-Reliability) Ver1.0", Jan. 8, 2003. pp. 1-45.

Ruslan Bilorusets et al., "Web Services Reliable Messaging Protocol (WS-ReliableMessaging)", Mar. 2004, pp. 1-40.

International Search Report dated Feb. 17, 2006, from related International Application No. PCT/US05/15322, 5 pp. including Notification of Transmittal.

Written Opinion of the International Searching Authority dated Feb. 17, 2006, from related International Application No. PCT/US05/15322, 3 pp.

International Searching Authority, "Notification of Transmittal of the International Search Report and the Written Opinion of the International Searching Authority, or the Declaration," PCT/US05/43599, dated Feb.28, 2007, 8 pages.

International Searching Authority, "Notification of Transmittal of the International Search Report and the Written Opinion of the International Searching Authority, or the Declaration," PCT/US05/41254, dated Mar. 28, 2007, 7 pages.

International Searching Authority, "Notification of Transmittal of the International Search Report and the Written Opinion of the International Searching Authority, or the Declaration," PCT/US05/44171, dated Nov. 30, 2006, 7 pages.

International Searching Authority, "Notification of Transmittal of the International Search Report and the Written Opinion of the International Searching Authority, or the Declaration," PCT/US2006/024375, dated Oct. 17, 2006, 10 pages.

OA U.S. Appl. No. 11/007,421, filed Dec. 7, 2004 Mailed on Oct. 16, 2006.

OA U.S. Appl. No. 10/991,792, filed Nov. 17, 2004 Mailed on Oct. 20, 2006.

International Searching Authority, "Notification of Transmittal of the International Search Report and the Written Opinion of the International Searching Authority, or the Declaration," PCT/US05/45625, dated Oct. 20, 2006, 7 pages.

International Searching Authority, "Notification of Transmittal of the International Search Report and the Written Opinion of the International Searching Authority, or the Declaration," PCT/US05/40861, dated Nov. 17, 2006, 7 pages.

Decasper, Dan et al., "Router Plugins: A Software Architecture for Next Generation Routers," IEEE ACM Transactions on Networking, vol. 9, No. 1, Feb. 2000, XP011038838, 14 pages.

U.S. Office Action mailed Jun. 26, 2007 from U.S. Appl. No. 11/195,160.

Notice of Allowance and Notice of Allowability, mailed Sep. 10, 2007 from U.S. Appl. No. 10/866,506.

Notice of Allowance and Notice of Allowability, mailed Sep. 28, 2007 from U.S. Appl. No. 10/866,507.

Notice of Allowance and Notice of Allowability, mailed Sep. 10, 2007 from U.S. Appl. No. 10/866,285.

Notice of Allowance and Notice of Allowability, mailed Oct. 11, 2007 from U.S. Appl. No. 11/010,089.

Notice of Allowance and Notice of Allowability, mailed Sep. 19, 2007 from U.S. Appl. No. 11/195,160.

U.S. Appl. No. 10/896,410, System and Method for Automatically Configuring Switch Ports With Appropriate Features, Spain et al., filed Jul. 21, 2004.

R. Droms, Dynamic Host Configuration Protocol, http://www.ietf.org/rfc/, Bucknell University, Mar. 1997 (RFC 2131), printed Mar. 24, 2005, 43 pages.

S. Alexander et al., DHCP Options and BOOTP Vendor Extensions, http://www.ietf.org/rfc/, Silicon Graphics, Inc., Mar. 1997 (RFC 2132), printed Mar. 24, 2005, 32 pages.

G. Stump et al., The User Class Option for DHCP, http://www.ietf.org/rfc/, IBM, Nov. 2000 (RFC 3004), printed Mar. 24, 2005, 6 pages.

Y. T'Joens, DHCP Reconfigure Extension, http://www.ietf.org/rfc/, Alcatel, Dec. 2001, printed Mar. 24, 2005 (RFC 3203), 6 pages.

M. Patrick, DHCP Relay Agent Information Option, http://www.ietf.org/rfc/, Motorola BCS, Jan. 2001 (RFC 3046), printed Mar. 24, 2005, 14 pages.

EPCg1, Frequently Asked Questions, http://www.epcglobalinc.com/about/faqs.html, printed Mar. 24, 2005, 9 pages.

M. Johnston, DHCP Preboot Execution Environment (PXE) Options draft-ietf-dhc-pxe-options-01.txt, Dynamic Host Configuration Working Group, Intel Corporation, Jan. 21, 2005, 7 pages.

R. Johnson, TFTP Server Address DHCP Option draft-raj-dhc-tftp-addr-option-00.txt, Network Working Group, Cisco Systems, Inc., Feb. 6, 2005, 7 pages.

J. Littlefield, Vendor-Identifying Vendor Options for Dynamic Host Configuration Protocol version 4 (DPHCPv4), Network Working Group, Request for Comments: 3925, Category: Standards Track, Cisco Systems, Inc., Oct. 2004, 9 pages.

Lonvick, C., The BSD Syslog Protocol, RFC 3164, Aug. 2001, 28 pages.

Schulzrinne, H., Dynamic Host Configuration Protocol (DHCPv4 and DHCPv6) Option for Civic Addresses Configuration Information, draft-ietf-geopriv-dhcp-civil-05, Internet-Draft, Feb. 19, 2004.

Polk, J., et al., Dynamic Host Configuration Protocol Option for Coordinate-based Location Configuration Information, RFC 3825, Jul. 2004, 15 pages.

AeroScout Visibility System: Bridging the Gap Between Wi-Fi, Active RFID and Telemetry, AeroScout Enterprise Visibility Solutions, http://www.aeroscout.com/content.asp? page= System Overview, printed Apr. 16, 2005, 3 pages.

WhereNet, Products, http://wherenet.com/products_main.html, printed Apr. 16, 2005, 2 pages.

Simple Network Management Protocol, Internetworking Technologies Handbook, Chapter-56, printed Jul. 14, 2005, 12 pages.

International Search Report dated Oct. 13, 2005, from (related) International Application No. PCT/US05/16484, 6 pp. including Notification of Transmittal.

Written Opinion of the International Searching Authority dated Oct. 13, 2005, from (related) International Application No. PCT/US05/16484, 5 pp.

Harrington, D., et al, An Architecture for DescribingSimple Network Management Protocol (SNMP) Management Frameworks, RFC 3411, Dec. 2002, 64 pages.

Presuhn, R., Editor, Version 2 of the Protocol Operations for the Simple Network Management Protocol (SNMP), RFC 3416, Dec. 2002, 31 pages.

Global Location No. (GLN) Implementation Guide, Uniform Code Council, Inc., May 2002, 13 pages.

Mockapetris, P., "*Domain Names—Concepts and Facilities*", RFC 1034, Nov. 1987, 43 pages.

International Search Report dated Jul. 13, 2006, from (related) International Application No. PCT/US05/16319, 5 pp. including Notification of Transmittal.

Written Opinion of the International Searching Authority dated Jul. 13, 2006, from (related) International Application No. PCT/US05/16319, 5 pp.

US Office Action mailed Aug. 9, 2006 from (related) U.S. Appl. No. 10/866,507.

US Office Action mailed Oct. 6, 2006 from (related) U.S. Appl. No. 10/866,506.

US Office Action mailed Oct. 6, 2006 from (related) U.S. Appl. No. 10/866,285.

US Office Action mailed Nov. 13, 2006 from (related) U.S. Appl. No. 11/073,245, 12 pp.

US Office Action mailed Jan. 18, 2007 from (related) U.S. Appl. No. 10/866,507, 4 pp.

U.S. Appl. No. 11/965,693, Network Based Device for Providing RFID Middleware Functionality, Singhal et al., filed Dec. 27, 2007.

Office Action (Restriction Requirement) mailed Apr. 1, 2008 from U.S. Appl. No. 11/119,169.

Notice of Allowance mailed Mar. 26, 2008 for U.S. Appl. No. 11/129,709.

International Searching Authority, "Notification of Transmittal of the International Search Report and the Written Opinion of the International Searching Authority, or the Declaration," PCT/US05/16958, dated Sep. 12, 2007.

Second Notice of Allowance and Notice of Allowability, mailed Jan. 11, 2008 for U.S. Appl. No. 10/010,089.

Supplemental Notice of Allowance and Notice of Allowability, mailed Oct. 22, 2007 from U.S. Appl. No. 11/195,160.

Notice of Allowance amd Notice of Allowability, mailed Mar. 12, 2007, from U.S. Appl. No. 11/073,245.

US Office Action mailed Mar. 3, 2008, for U.S. Appl. No. 11/809,139.

First Office Action from the Chinese Patent Application No. 200580015167.4 issued on Feb. 29, 2008.

First Office Action from the Chinese Patent Application No. 200580015169.3 issued on Feb. 29, 2008.

First Office Action from the Chinese Patent Application No. 200580015168.9 issued on Feb. 29, 2008.

Office Action from Canadian Patent Application No. 2,565,099 issued Feb. 4, 2008.

Office Action from Canadian Patent Application No. 2,565,456 issued on Feb. 1, 2008.

International Preliminary Report on Patentability mailed Nov. 23, 2006, Application No. PCT/US2005/016484.

International Preliminary Report on Patentability mailed Nov. 23, 2006, Application No. PCT/US2005/015322.

International Preliminary Report on Patentability mailed Nov. 23, 2006, Application No. PCT/US2005/016319.

International Preliminary Report on Patentability mailed Oct. 11, 2007, Application No. PCT/US2005/016958.

Notice of Allowance and Allowability, mailed Aug. 8, 2009, from U.S. Appl. No. 11/129,709.

US Office Action (Restriction Requirement) mailed Jul. 28, 2008, for U.S. Appl. No. 11/182,312.

International Searching Authority, "Notification of Transmittal of the International Search Report and the Written Opinion of the International Searching Authority, or the Declaration," PCT/US07/16321, dated May 19, 2008, 11 pages.

International Searching Authority, "Notification of Transmittal of the International Search Report and the Written Opinion of the International Searching Authority, or the Declaration," PCT/US06/, dated Mar. 6, 2008, 14 pages.

U.S. Appl. No. 12/082,635, Methods and Devices for Providing Scalable RFID Networks, Howarth et al., filed Apr. 11, 2008.

International Searching Authority, Notification of Tranmittal of the International Search Report and the Written Opinion on the International Searching Authority, or the Declaration, International application No. PCT/US05/46149, dated Jul. 20, 2007, 9 pages.

Claims, International application No. PCT/US05/46149, 10 pages.

Office Action mailed Aug. 6, 2008 from U.S. Appl. No. 11/119,169.

Abbott, et al., "Alternatives for Providing Routing and Location Information to Support Emergency Calling from IP Enterprises", NENA Technical Information Document; Oct. 3, 2003, XP002323684, 16 pgs.

Burns, et al., "Implementing Address Assurance in the Intel IxP Router", Western Network Processors Conference, Oct. 2002, 17 pgs.

Chiu, et al., "Investigating the Limits of SOAP Performance for Scientific Computing," Nov. 7, 2002, IEEE Computer Society, 8 pgs.

EPCglobal EPCTM Generation 1 Tag Data Standards Version 1.1 Rev. 1.27; http://www.epcglobalinc.org/standards/tds/tds_|_|rev_|_27-standard-2005051.pdf; 87 pgs (submitted in 3 parts).

Kanellos, "Newsmaker: Making sense of sensors," CNET News.com: news.com.com/Making+sense+of+sensors/ 2008-1082_3-5829415.html, Published: Aug. 12, 2005.

Mohl, "IEEE 1588: Running Real-Time on Ethernet; Getting the Right web server—Time to consider Ethernet for I/O," retrieved from Internet at <http://ethernet.industrial-networking.com/articles/i17 real-time.asp>; downloaded on Mar. 10, 2004.

Montague, (2003) "Ethernet Hits Real-Time . . . Really," Control Engineering, Dec. 1, 2003, copyright 2004 Reed Business Information, a division of Reed Elsevier Inc.; retrieved from Internet at <http://www.manufacturing.net/ctl/iindex.asp?dlayout=article Print&-articleID=CA339683>; downloaded on Mar. 1, 2004.

RFC-2236 Internet Group Management Protocol, v.1, Nov. 1997, retrieved from the Internet on Oct. 22, 2007 and Aug. 5, 2010 at http://www.faqs.org/rfcs/rfc2236.html, 19 pgs.

Schulzrinne, "Dynamic Host Configuration Protocol (DHCPv4 and DHCPv6) Option for Civic Addresses Configuration Information," draft-ietf-geopriv-dhcp-civil-05, Internet-Draft, Feb. 19, 2004.

Australian Examination Report dated Apr. 17, 2009, from AU Appl. No. 2005246794.

Canadian Examination Report dated Oct. 14, 2010, from CA Appl. No. 2565099.

Chinese Office Action (second) dated Aug. 15, 2008, from Appl. No. CN200580015167.4.

Chinese Office Action (second) dated Aug. 15, 2008, from Appl. No. CN200580015169.3.

Chinese Office Action (second) dated Aug. 15, 2008, from Appl. No. CN200580015168.9.

Chinese Office Action dated Oct. 23, 2009, from Appl. No. CN200580015166.X.

EP Supplementary European Search Report dated Aug. 9, 2010, in Appl. No. EP05750091.0.

EP Office Action dated Oct. 8, 2010, in Appl. No. EP05750091.0.

EP Supplementary European Search Report dated Aug. 6, 2010, in Appl. No. EP05743006.8.

EP Office Action dated Oct. 18, 2010, in Appl. No. EP05743006.8.

EP Supplementary European Search Report dated Aug. 6, 2010, in Appl. No. EP05747434.8.

EP Office Action dated Oct. 26, 2010, in Appl. No. EP05747434.8.

EP Supplementary European Search Report dated Aug. 6, 2010, in Appl. No. EP05753531.2.

EP Office Action dated Oct. 8, 2010, in Appl. No. EP05753531.2.

PCT International Preliminary Examination Report mailed on Nov. 23, 2006, from PCT/US2005/016484.

PCT International Preliminary Report on Patentability mailed on Nov. 23, 2006, from PCT/US2005/015322.

PCT International Search Report and Written Opinion mailed on Mar. 6, 2008, from PCT/US2006/026970.

US Office Action dated Aug. 13, 2008, from U.S. Appl. No. 11/954,721.

US Notice of Allowance dated Feb. 11, 2009, from U.S. Appl. No. 11/954,721.

US Notice of Allowance dated Jun. 1, 2009, from U.S. Appl. No. 11/954,721.

US Notice of Allowance dated Sep. 22, 2009, from U.S. Appl. No. 11/954,721.
US Office Action dated Jul. 31, 2009, from U.S. Appl. No. 10/891,238.
US Office Action Final dated Feb. 4, 2010, from U.S. Appl. No. 10/891,238.
US Office Action dated Jun. 10, 2010, from U.S. Appl. No. 10/891,238.
US Office Action dated Nov. 17, 2010, from U.S. Appl. No. 10/891,238.
US Office Action dated Mar. 31, 2009, from U.S. Appl. No. 11/304,944.
US Final Office Action dated Oct. 30, 2009, from U.S. Appl. No. 11/304,944.
US Office Action dated Apr. 14, 2010, from U.S. Appl. No. 11/304,944.
US Office Action dated Oct. 28, 2010, from U.S. Appl. No. 11/304,944.
US Non-Final Office Action dated Oct. 26, 2010, from U.S. Appl. No. 12/082,635.
US Office Action dated Aug. 4, 2009, from U.S. Appl. No. 11/496,779.
US Office Action Final dated Jan. 26, 2010, from U.S. Appl. No. 11/496,779.
US Non-Final Office Action dated Nov. 22, 2010, from U.S. Appl. No. 11/496,779.
US Notice of Allowance dated Feb. 11, 2009, from U.S. Appl. No. 11/119,169.
US Notice of Allowance dated Jun. 4, 2009, from U.S. Appl. No. 11/119,169.
US Notice of Allowance dated Dec. 15, 2009, from U.S. Appl. No. 11/119,169.
US Notice of Allowance dated Apr. 19, 2010, from U.S. Appl. No. 11/119,169.
US Notice of Allowance dated Nov. 10, 2008, from U.S. Appl. No. 11/129,709.
US Notice of Allowance dated Apr. 13, 2009, from U.S. Appl. No. 11/129,709.
US Notice of Allowance dated Aug. 31, 2009, from U.S. Appl. No. 11/129,709.
US Office Action dated Nov. 26, 2008, from U.S. Appl. No. 11/182,312.
US Office Action dated Jun. 10, 2009, from U.S. Appl. No. 11/182,312.
US Office Notice of Allowance dated May 11, 2010, from U.S. Appl. No. 11/182,312.
US Office Notice of Allowance dated Sep. 1, 2010, from U.S. Appl. No. 11/182,312.
US Examiner's Amendment dated Nov. 7, 2007, from U.S. Appl. No. 11/195,160.
US Office Action dated Jun. 1, 2009, from U.S. Appl. No. 11/965,693.
US Office Final Action dated Nov. 2, 2009, from U.S. Appl. No. 11/965,693.
US Office Action dated Apr. 28, 2010, from U.S. Appl. No. 11/965,693.
US Office Action dated Nov. 16, 2010, from U.S. Appl. No. 11/965,693.
US Office Action dated Oct. 2, 2009, from U.S. Appl. No. 11/346,739.
US Office Action Final dated Apr. 14, 2010, from U.S. Appl. No. 11/346,739.
US Office Action dated May 24, 2010 issued in U.S. Appl. No. 11/005,978 [Palermo].
US Office Action Final dated Dec. 28, 2009 issued in U.S. Appl. No. 11/005,978 [Palermo].
US Office Action dated Jun. 15, 2009 issued in U.S. Appl. No. 11/005,978 [Palermo].
US Office Action Final dated Aug. 2, 2010 issued in U.S. Appl. No. 11/089,794 [Palermo].
US Office Action Final dated Jan. 5, 2010 issued in U.S. Appl. No. 11/089,794 [Palermo].
US Office Action dated Jun. 24, 2009 issued in U.S. Appl. No. 11/089,794 [Palermo].
US Office Action Final dated Feb. 3, 2009 issued in U.S. Appl. No. 11/089,794 [Palermo].
US Office Action dated Mar. 2, 2010 issued in U.S. Appl. No. 11/090,920 [Palermo].
US Office Action dated Aug. 14, 2009 issued in U.S. Appl. No. 11/090,920 [Palermo].
US Office Action Final dated Apr. 23, 2009 issued in U.S. Appl. No. 11/090,920 [Palermo].
US Office Action dated Nov. 4, 2008 issued in U.S. Appl. No. 11/090,920 [Palermo].
US Notice of Allowance and Examiner Amendment dated Mar. 27, 2008 issued in U.S. Appl. No. 10/896,410 [KRU-410].
US Office Action dated Oct. 10, 2007 issued in U.S. Appl. No. 10/896,410 [KRU-410].
US Office Action dated Aug. 27, 2010 issued in U.S. Appl. No. 11/090,920 [Palermo].

* cited by examiner

DC_Switch1# configure terminal   /251

Enter configuration commands, one per line. End with CNTL/Z.   /255

DC_Switch1(config)# interface FastEthernet0/7   /260

DC_Switch1(config-if)# macro apply RFID_Macro1 $RFID 30   /265

DC_Switch1(config-if)#   /270

*Fig. 2B*

AUTOMATED CONFIGURATION OF NETWORK DEVICE PORTS

CROSS-REFERENCE TO RELATED APPLICATIONS

This application claims priority to U.S. Provisional Patent Application No. 60/570,999, entitled "Methods and Devices for Uniquely Provisioning RFID Devices" and filed on May 13, 2004, which is hereby incorporated by reference for all purposes. This application is related to U.S. patent application Ser. No. 10/866,506, entitled "Methods and Devices for Uniquely Provisioning RFID Devices" and filed on Jun. 9, 2004, to U.S. patent application Ser. No. 10/866,507, entitled "Methods and Devices for Locating and Uniquely Provisioning RFID Devices" and filed on Jun. 9, 2004, to U.S. patent application Ser. No. 10/866,285, entitled "Methods and Devices for Assigning RFID Device Personality" and filed on Jun. 9, 2004, to U.S. patent application Ser. No. 10/896,410, filed Jul. 21, 2004 and to U.S. patent application Ser. No. 11/010,089, entitled "Methods and Devices for Providing Scalable RFID Networks" and filed on Dec. 9, 2004 (collectively, the "Cross-Referenced Applications"), all of which are hereby incorporated by reference for all purposes.

BACKGROUND OF THE INVENTION

1. Field of the Invention

The present invention relates the configuration of devices in a network.

2. Description of the Related Art

It is becoming commonplace for devices, including but not limited to RFID readers, RFID printers, VoIP telephones and devices used in manufacturing, to be deployed in large numbers within some networks. These devices often have unique characteristics, such as traffic type, bandwidth requirements, security demands, etc. Accordingly, such devices require specific network configurations, e.g., quality of service ("QoS"), security settings, VLANs or VSANs, etc. to properly support their desired functionality.

FIG. 1 illustrates a portion of a network 100, in which network device 105 (in this example, a Catalyst™ switch provided by Cisco Systems, Inc.) is connected to a plurality of devices, including RFID reader 110. In this example, RFID reader 110 is connected to port 120 via a fast Ethernet connection. For each port of network device 105, a variety of attributes may be configured, such as QoS, security, port speed, description, etc.

Within network 100, a large number of devices and associated network devices may be deployed. In general, it is a tedious and time-consuming process for users to deploy devices and to manage the associated infrastructure components, such as switches and other network devices. For example, the process of configuring switch port settings is currently a manual process, in which each desired attribute must be individually selected and enabled for a port.

This manual configuration process is currently inhibiting the deployment of large-scale RFID networks, manufacturing device networks, etc. It would be desirable to provide improved methods and devices that overcome at least some limitations of the prior art.

SUMMARY OF THE INVENTION

Methods and devices are provided for identifying end devices and automatically configuring associated network settings. Preferred implementations of the invention do not require users to manually identify connection types (e.g., RFID, IPphone, manufacturing device, etc.) or to manually configure the network device. Accordingly, such implementations allow automatic switch configuration, even for devices that use inconsistent protocols and/or protocols that are not well known.

Some methods of the invention employ DHCP options combined with traffic snooping to identify devices and automatically apply appropriate switch port configuration. Some such implementations of the invention trigger Cisco Systems' SmartPorts™ software to configure ports of network devices. Some aspects of the SmartPorts software are described in U.S. patent application Ser. No. 10/896,410, filed Jul. 21, 2004, which has been incorporated herein by reference. However, the present invention is not limited to implementation via SmartPorts™; any convenient software for the automated configuring of network device ports may be used in accordance with the present invention.

Some implementations of the invention provide a method for establishing network device port settings. The method includes the steps of receiving a DHCPDISCOVER request from a device and of determining, based on information in the DHCPDISCOVER request, whether an appropriate macro is available to configure a port of a network device on which the DHCPDISCOVER request was first received.

The method may also include the step of applying the appropriate macro when it is determined to be available. The method preferably includes the step of determining whether the port has already been configured in a manner appropriate for the device.

The determining step may involve determining a device personality, identifying the device and/or examining at least one DHCP option or other component of the DHCPDISCOVER request. The "other component" could be, for example, one or more parts of the DHCP message header. The determining step may or may not be performed by the network device on which the DHCPDISCOVER request was first received. For example, the DHCPDISCOVER request may first be received by a switch port and the determining step may be performed by one of a DHCP server, an edge services management server, an authentication server and a device dedicated to port configuration.

Some embodiments of the invention provide at least one apparatus for establishing network device port settings. Such embodiments include a port for receiving a DHCPDISCOVER request from a device and at least one logic device configured for determining, based on information in the DHCPDISCOVER request, whether an appropriate macro is available to configure the port.

A logic device may examine one or more DHCP options of the DHCPDISCOVER request. The port and the logic device(s) may be included within a single device or may be disposed in separate devices. For example, the port and the logic device(s) may be included within a single switch or a DHCP server.

Alternative embodiments of the invention provide a network device that includes these elements: a plurality of ports; a storage device; and at least one logic device configured to receive a DHCPDISCOVER request from a device via a first port and configure the first port with appropriate configuration parameters for the device.

A logic device may be further configured to forward a copy of the DHCPDISCOVER request to a second device. A logic device may configure the first port according to instructions received from the second device. The second device may be, for example, a DHCP server, an edge services management server, an authentication server or a device dedicated to port configuration.

The methods of the present invention may be implemented, at least in part, by hardware and/or software. For example, some embodiments of the invention provide computer programs embodied in machine-readable media. The computer programs include instructions for controlling one or more devices to perform the methods described herein.

BRIEF DESCRIPTION OF THE DRAWINGS

FIG. 2B illustrates an exemplary set of commands to be used for configuring a port according to a SmartPorts™ macro.

DETAILED DESCRIPTION OF THE INVENTION

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Although the present invention involves methods and devices for identifying and provisioning individual RFID devices in a network, many aspects of the present invention can be applied to identifying and provisioning other types of devices in a network. Similarly, although much of the discussion herein applies to implementations using the DHCP protocol, the present invention is not protocol-specific and may be used, for example, in implementations using UPnP, 802.1ab or similar discovery protocols. Likewise, while the implementations described herein refer to exemplary DHCP Options, other DHCP Options may advantageously be used to implement the present invention.

Similarly, while some exemplary implementations of the invention involve using the SmartPorts™ "macro" functionality for configuring ports of network devices, other such tools could be used. In other implementations of the invention, a command line interface ("CLI") or another programmatic interface such as Simple Network Management Protocol ("SNMP") or Netconf® is used for this purpose.

Prior implementations of SmartPorts™ macros required users to manually identify connection types (e.g., RFID, manufacturing, IPphone) and then to configure a network device according to the identified connection type. As used herein, the term "macro" will sometimes be used to mean both the commands used to configure, e.g., a port of a network device and a configuration resulting from the application of such a macro. The network device could be configured, for example, using a command line interface or a network management tool such as CMS on a per-port basis.

Figure 2A:
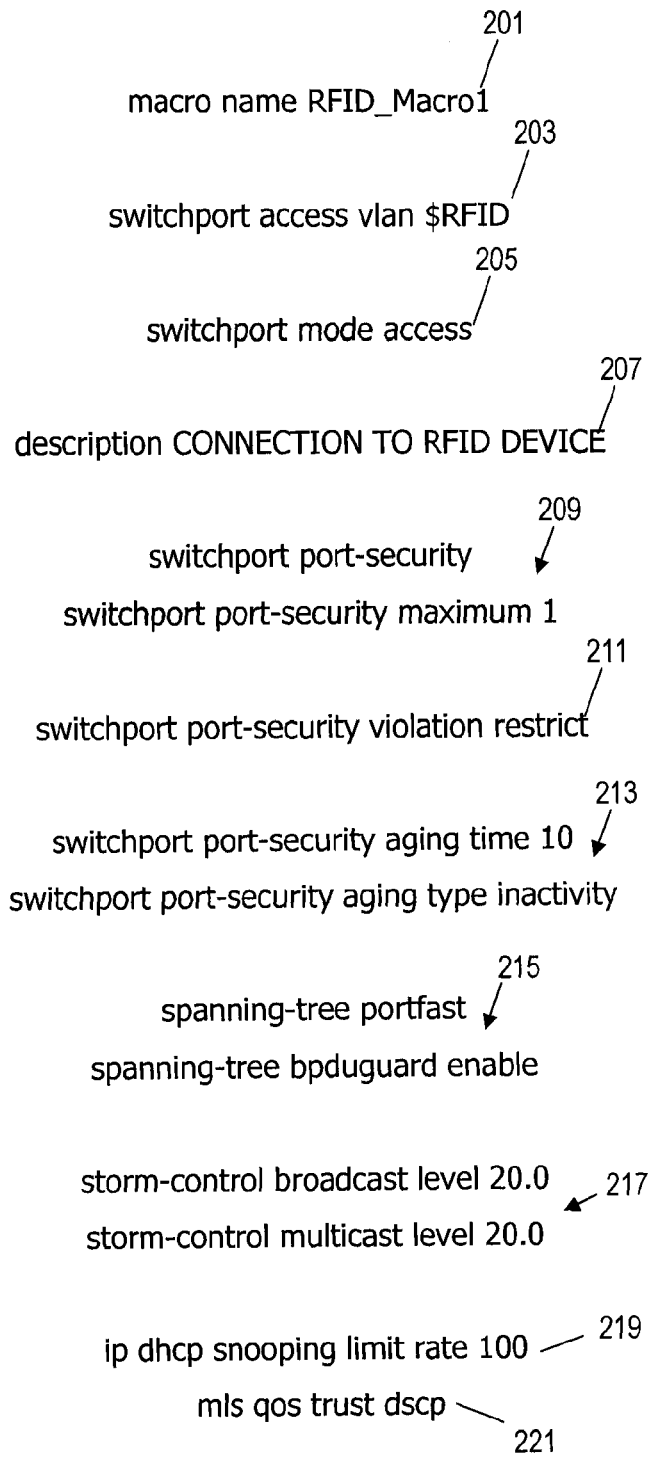
FIG. 2A illustrates an exemplary SmartPorts™ macro.

An exemplary Cisco SmartPorts™ macro for configuring a port for an RFID device will now be described with reference to FIG. 2A. Line 201 is used to establish the macro's name, which in this case is RFID_Macro1. It is helpful to use a name that is easy to recognize as one type of macro for RFID devices, to allow for the possibility of having macros for multiple device types and multiple macros for RFID devices.

Line 203 will cause an RFID VLAN to be assigned and line 205 puts a switch port in "access" mode. Line 207 assigns a generic description to the interface indicating its use, which is a connection to an RFID device in this example. Lines 209 enable port security and limit the port to a single media access control ("MAC") address.

According to line 211, when the maximum number of MAC addresses is exceeded, traffic from additional source MAC addresses are dropped. In addition, an SNMP trap and a syslog message are generated. Lines 213 cause the secure MAC address to age out after 10 minutes of inactivity.

Lines 215 configure the port as an edge device port that does not need to behave according to a spanning tree protocol. Accordingly, bridge port data unit ("BPDU") packets are not be allowed to enter the network from this port. "Spanning-tree portfast" allows the port to move into the forwarding state quickly.

Lines 217 set broadcast and multicast storm control limits to 20% of the interface bandwidth. As with other settings in this example, this limit should be based upon the anticipated requirements of the device to be in communication with the port. Line 219 applies a rate limiting of DHCP packets coming from the device to 100 packets per second.

Line 221 is one example of a QoS for the device. This QoS is applicable, for example, if the device is an RFID reader that sends packets marked with DSCP and if these values should be trusted.

FIG. 2B sets forth one example of how to apply the previously-described SmartPorts macro to a switch port. FIG. 2B is a screen capture of a CLI session for configuring a port. Line 251 identifies the switch to be configured ("DC_Switch1"). Line 255 is a prompt from switch DC_Switch1. Line 260 configures the interface as a Fast Ethernet interface.

Line 265 applies a selected macro, which is "RFID_Macro1" in this example, to the interface. The example assumes that VLAN 30 has previously been configured as the RFID VLAN. Line 270 is a command prompt from switch DC_Switch1.

Figure 1:
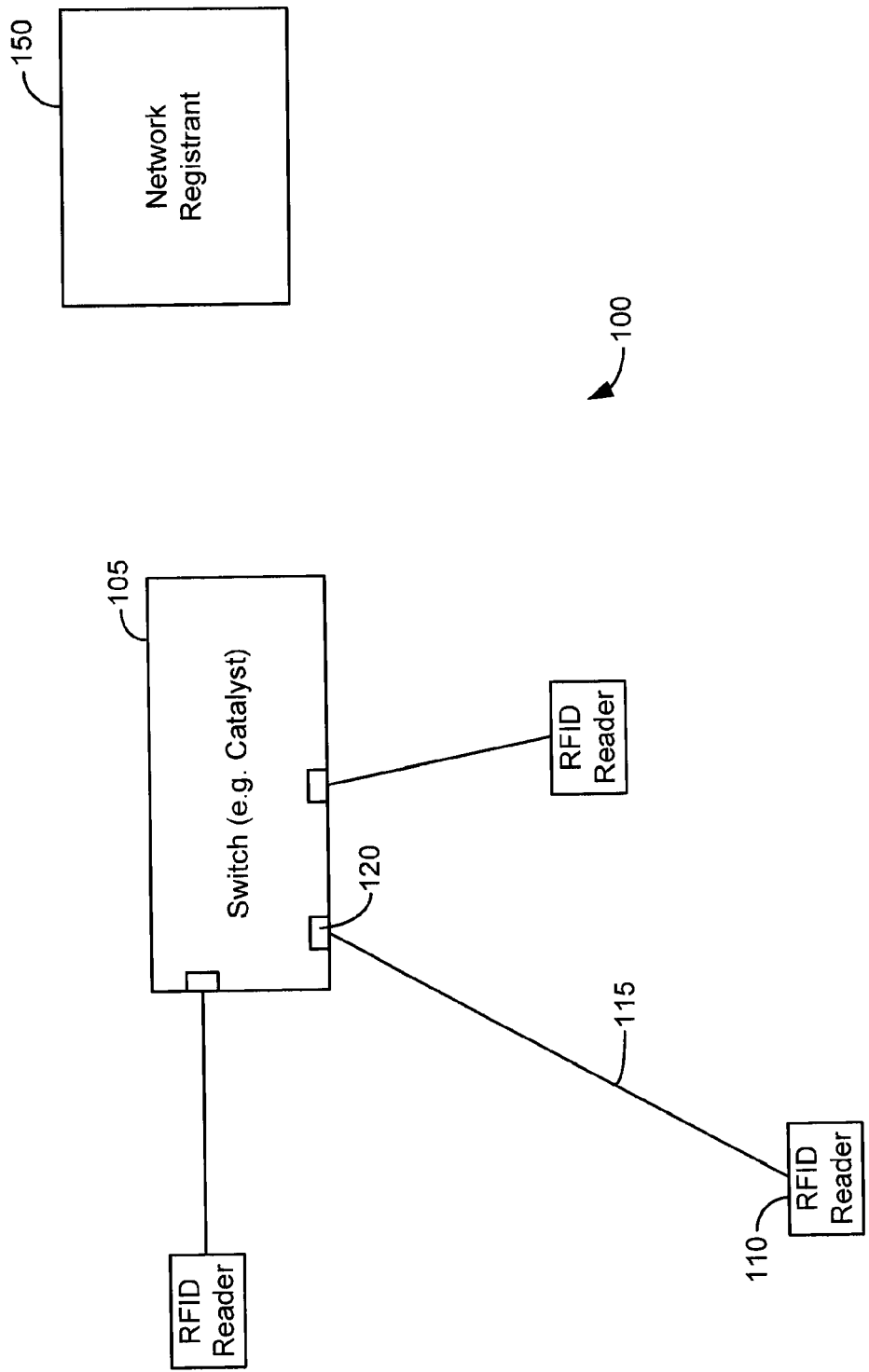
FIG. 1 is a network diagram illustrating a switch and attached RFID devices.

Referring back to FIG. 1, for example, in order to configure port 120 using prior implementations of SmartPorts, a user (e.g., a network administrator) would need to manually go into every port, select a macro for each device (if one exists) and apply the appropriate macro to the port to which the device is connected. For example, the user would need to determine the appropriate port configuration for a connection with RFID reader 110, determine whether a macro exists for this configuration, and, if so, apply the appropriate macro to configure port 120. If no such macro existed, each attribute of the port configuration would need to be separately indicated.

Figure 3A:
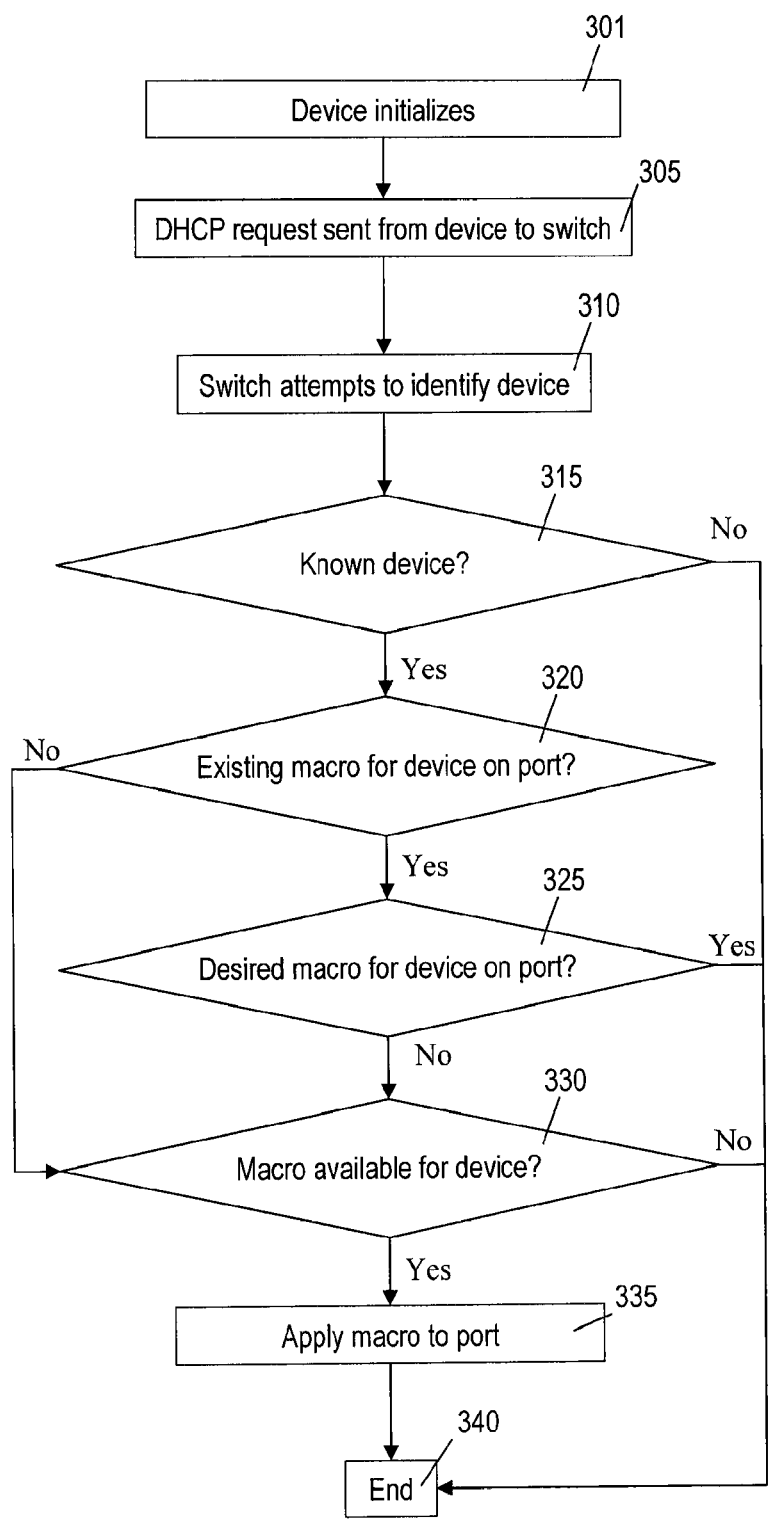
FIG. 3A is a flow chart that provides an overview of a method of the present invention.
Figure 3B:
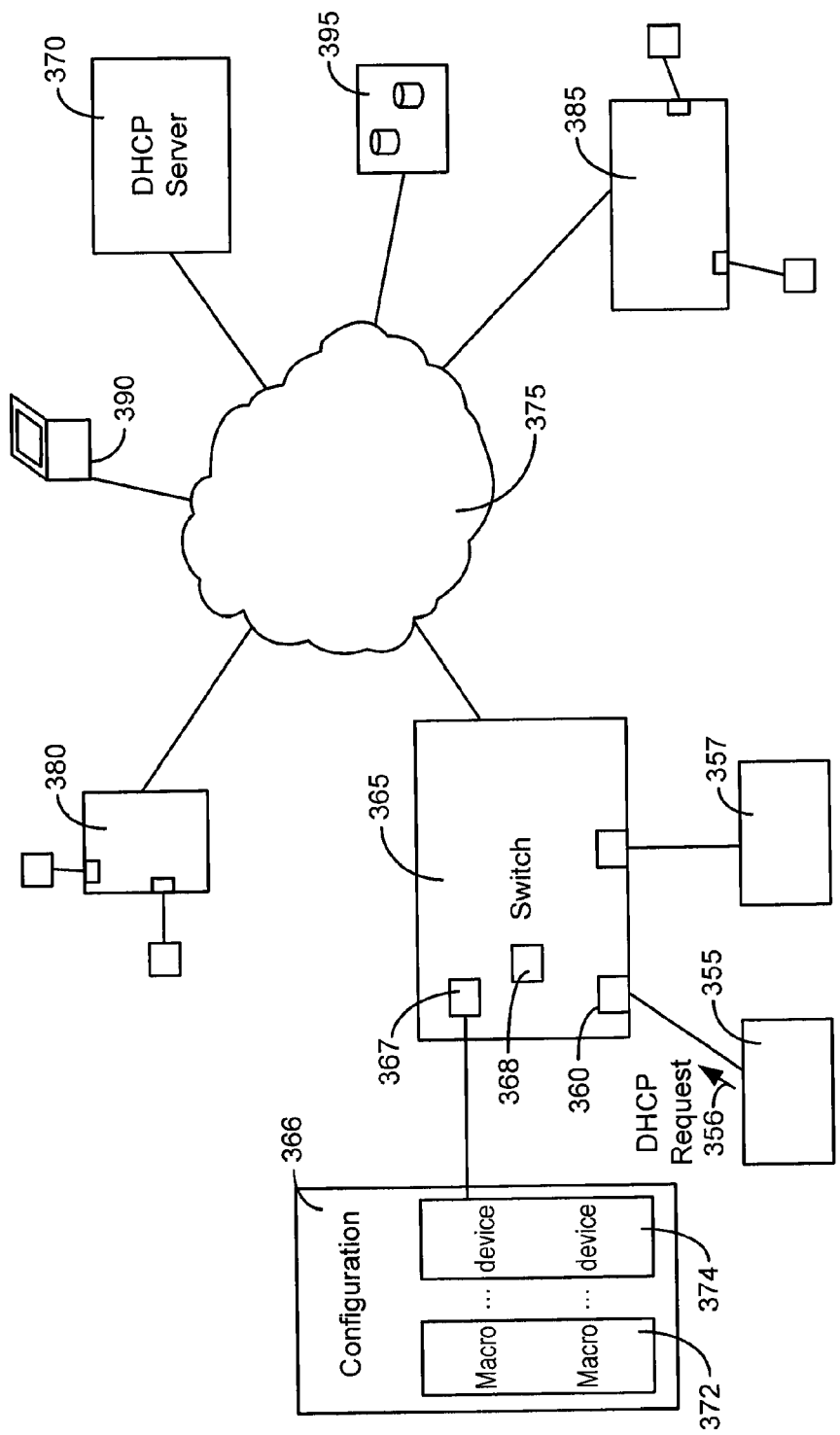
FIG. 3B is a network diagram that illustrates an implementation of the method outlined in FIG. 3A.

Some exemplary implementations of the invention will now be described with reference to FIGS. 3A and 3B. FIG. 3A is a flow chart that outlines method 300 according to the invention. FIG. 3B is a simplified network diagram of network 350 that provides one example of how method 300 may be implemented.

Those of skill in the art will appreciate that some steps of the methods discussed herein, including method 300, need not be performed (and in some implementations are not performed) in the order shown. Moreover, some implementations of the methods discussed herein may include more or fewer steps than those shown, e.g., in FIG. 3A.

Similarly, those of skill in the art will appreciate that the elements of FIG. 3B are both simplified and merely illustrative. FIG. 3B illustrates switches 365, 380 and 385, all of which have attached devices. In this example, switch 365 is a Cisco Catalyst 4500 Series switch and switches 380 and 385 are Cisco Catalyst 3750 Series switches. However, one of skill in the art will appreciate that other types of network devices could be used to implement the invention. Moreover, switches 365, 380 and 385 could be in the same location (e.g., in the same warehouse or factory) or could be in different locations. Switches 365, 380 and 385 can communicate with DHCP server 370, host device 390 and storage devices 395 via network 375. Accordingly, network 375 may include portions of one or more private networks and part of the Internet.

The devices attached to switches 365, 380 and 385 are not necessarily all of the same type. In this example, device 355 is an RFID reader and device 357 is an IP telephone. As discussed elsewhere herein, even devices that are of the same general type may have different capabilities and/or different desired functions.

A device that sends out an initiation for an IP address to a DHCP server does so by way of a packet that includes a "DHCPDISCOVER" request. This command includes, inter alia, the media access control ("MAC") address of the device. RFC 2131 is hereby incorporated by reference.

Accordingly, in step 301 of method 300, device 355 of FIG. 3B initializes and then sends DHCPDISCOVER request 356 to port 360 of switch 365. Switch 365 is configured not only to forward DHCPDISCOVER request 356 to DHCP server 370 via network 375, but also to analyze the contents of DHCPDISCOVER request 356. The steps performed by switch 365 according to method 300 may be controlled by one or more logic devices 368, which is an ASIC in this example. However, logic device(s) 368 could be any convenient logic device(s).

In step 315, switch 365 attempts to identify device 355 according to information in DHCPDISCOVER request 356. In this example, switch 365 applies "snooping" techniques to analyze the contents of Options in DHCPDISCOVER request 356. Switch 365 may, for example, examine the contents of DHCP Option 60 to determine a device type or vendor identifier. RFC 2132 is hereby incorporated by reference. Switch 365 may examine the "Enterprise number" field of DHCP Option 125 to determine the EPCGlobal enterprise number of the device. RFC 3925 is hereby incorporated by reference.

Alternatively, or additionally, switch 365 may examine other DHCP options. For example, switch 365 may examine DHCP Option 150 to identify device 355; this Option is used, for example, by IPPhones provided by Cisco Systems, Inc. R. Johnson's draft "TFTP Server Address DHCP Option" (Network Working Group Feb. 6, 2005) describes relevant information and is hereby incorporated by reference. Switch 365 may examine a "PXE boot" option to determine an appropriate configuration for port 360. M. Johnston's draft "DHCP Preboot execution Environment (PXE) Options" (Dynamic Host Configuration Working Group Jan. 21, 2005) describes relevant information and is hereby incorporated by reference. Switch 365 may examine Option 43 to obtain vendor-specific information regarding device 355. Switch 365 may examine Option 61 to determine an EPC identifier of device 355.

In some implementations, switch 365 also determines an appropriate personality for device 355 in step 315. In some such implementations, switch 365 examines the DHCP Option 77 to determine a device personality. In other implementations, switch 365 can determine an appropriate personality for device 355 indirectly, e.g., by cross-referencing a look-up table or a similar data structure based on other information in DHCPDISCOVER request 356. The look-up table could be stored locally (e.g., in memory 367), on an attached device or on another device that switch 365 can access via network 375, part of which is the Internet in this example.

If switch 365 cannot identify device 355, the process ends in this example (step 340 of FIG. 3A). Alternatively (or additionally), a network administrator could be alerted, e.g., by causing switch 365 to send a message to host device 390.

However, if switch 365 can identify the device, the method proceeds to step 320, wherein switch 365 determines port 360 is already configured. (In the flow chart of FIG. 3A it is presumed that a port configuration (if any) has resulted from the application of a macro, though this need not be the case.)

If port 360 has not yet been configured, it is determined whether there is a configuration macro available (e.g., locally available and stored in memory 367) that is appropriate for device 355. (Step 330.) Table 366 is one exemplary data structure that may be used for such a purpose. Table 366 includes macro field 372, for defining a plurality of configuration macros, each of which corresponds to a device of device ID field 374. Accordingly, a device ID determined as described above with reference to step 315 (or otherwise) can be used to determine whether there is a corresponding macro.

If port 360 is already configured, it is determined in step 325 whether the configuration is suitable for the device identified in step 315. If so, the process ends.

If the port does not have a desired configuration, it is determined in step 330 whether there is an appropriate macro available for the device. If there is an appropriate macro available for the device, the macro is applied (step 335) and then the process ends (step 340). If not, the process ends without a macro being applied. Preferably, a network administrator is notified, e.g., by sending a message from switch 365 to host device 390.

In the preceding example, switch 365 had the intelligence for determining how to automatically configure a port on which a DHCPDISCOVER request is received. The switch itself analyzed the DHCPDISCOVER request and configured the port with an appropriate combination of attributes. These combinations of attributes, along with the necessary software for applying them, were stored in the switch itself.

Figure 4:
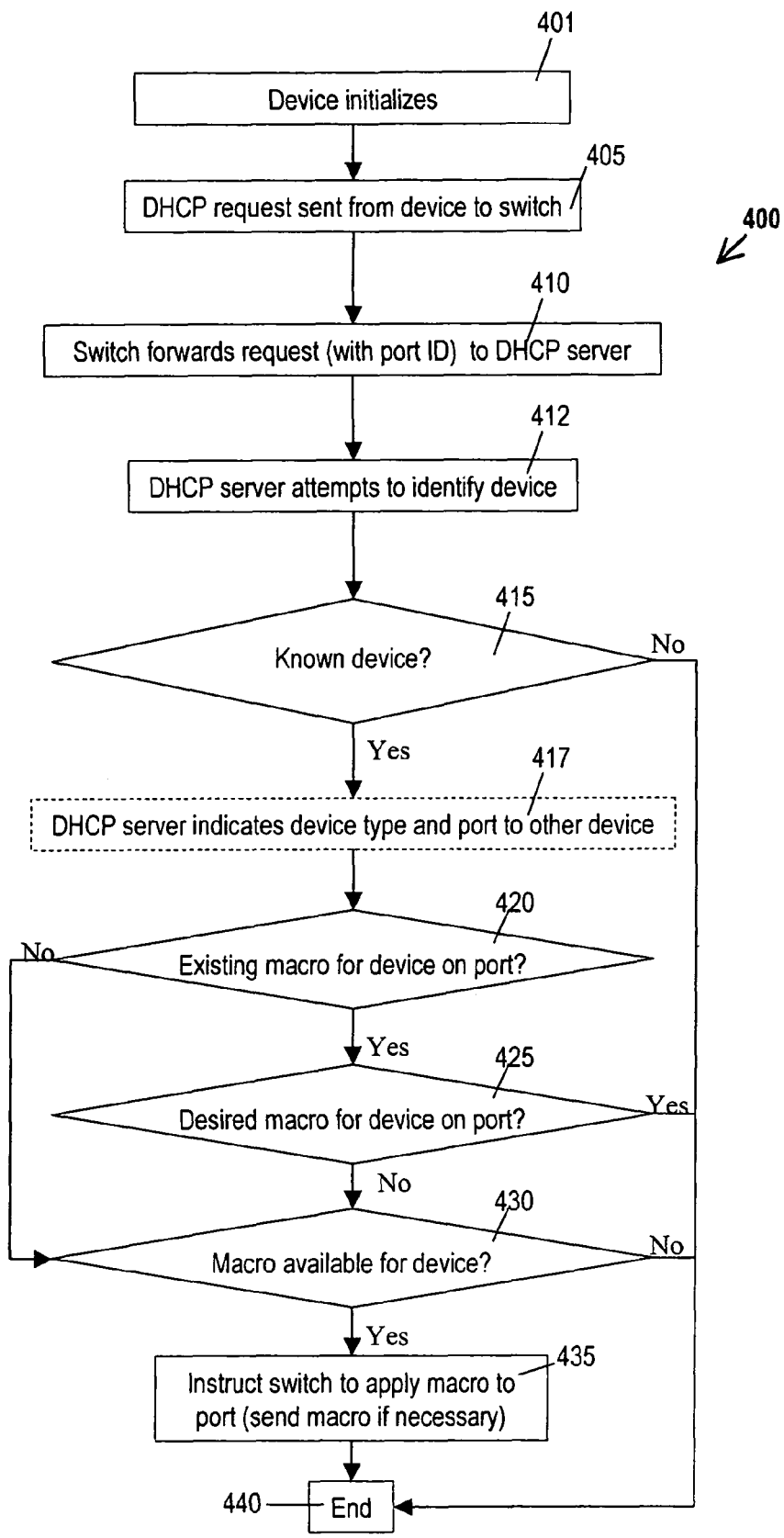
FIG. 4 is a flow chart that provides an overview of an alternative method of the present invention.

However, in other implementations of the invention, both the intelligence for determining how appropriately to configure the port and the instructions for so configuring the port may be owned by another device. For example, the intelligence may reside in DHCP server 370, an edge services management server, an authentication server and a device dedicated to port configuration. Some such implementations are illustrated by the flow chart of FIG. 4.

In steps 401 and 405, a device initializes and sends a DHCPDISCOVER request to a switch port. In this example, switch 365 forwards the DHCPDISCOVER request with an indication of the port on which the DHCPDISCOVER request was received. (Step 410.) The port ID could be provided, for example, in DHCP Option 82. Preferably, the switch also forwards information regarding the current port configuration to DHCP server 370.

According to some implementations, DHCP server 370 attempts to identify the device. (Step 412.) If DHCP server 370 can identify the device, DHCP server 370 performs steps 420, 425 and 430, which are analogous to steps 320 through 330 of method 300.

DHCP server 370 then instructs switch 365 to configure the port in an appropriate manner, e.g., by applying a macro. (Step 435.) Macros (or the like) for this purpose could be stored in switch 365, could be sent from DHCP server 370 to switch 365, or could be obtained by switch 365 from another device. For example, DHCP server 370 could send switch 365 a pointer to a memory space wherein such instructions are stored (e.g., in one of storage devices 395).

In other implementations, DHCP server 370 provides an IP address in response to the DHCPDISCOVER request and forwards the DHCPDISCOVER request to another device that performs steps similar to steps 310 through 330. The device could be, e.g., an authentication server or a server that is dedicated to automated port configuration. This device could instruct switch 365 to configure the port in an appropriate manner, e.g., as described above.

Alternatively, DHCP server 370 could perform at least the device and port identification steps. DHCP server 370 could then forward this information to another device that first performs a mapping of device type to desired configuration and then instructs switch 365 to configure port 360 accordingly.

In yet other implementations, a device local to switch 365 performs steps similar to those of steps 315 through 330 and then instructs switch 365 accordingly. For example, a DHCP relay agent in switch 365 is programmed to forward a copy of the DHCPDISCOVER request to another device (e.g., an edge services management server) that performs steps similar to steps 310 through 330, e.g., prior to forwarding the DHCPDISCOVER request to the DHCP server. In such implementations, the DHCP server could behave as a normal DHCP server and switch 365 could lack the intelligence to perform steps 310 through 330. The DHCPDISCOVER request could be forwarded to another device on the local network that performs steps similar to steps 310 through 330.

Figure 5:
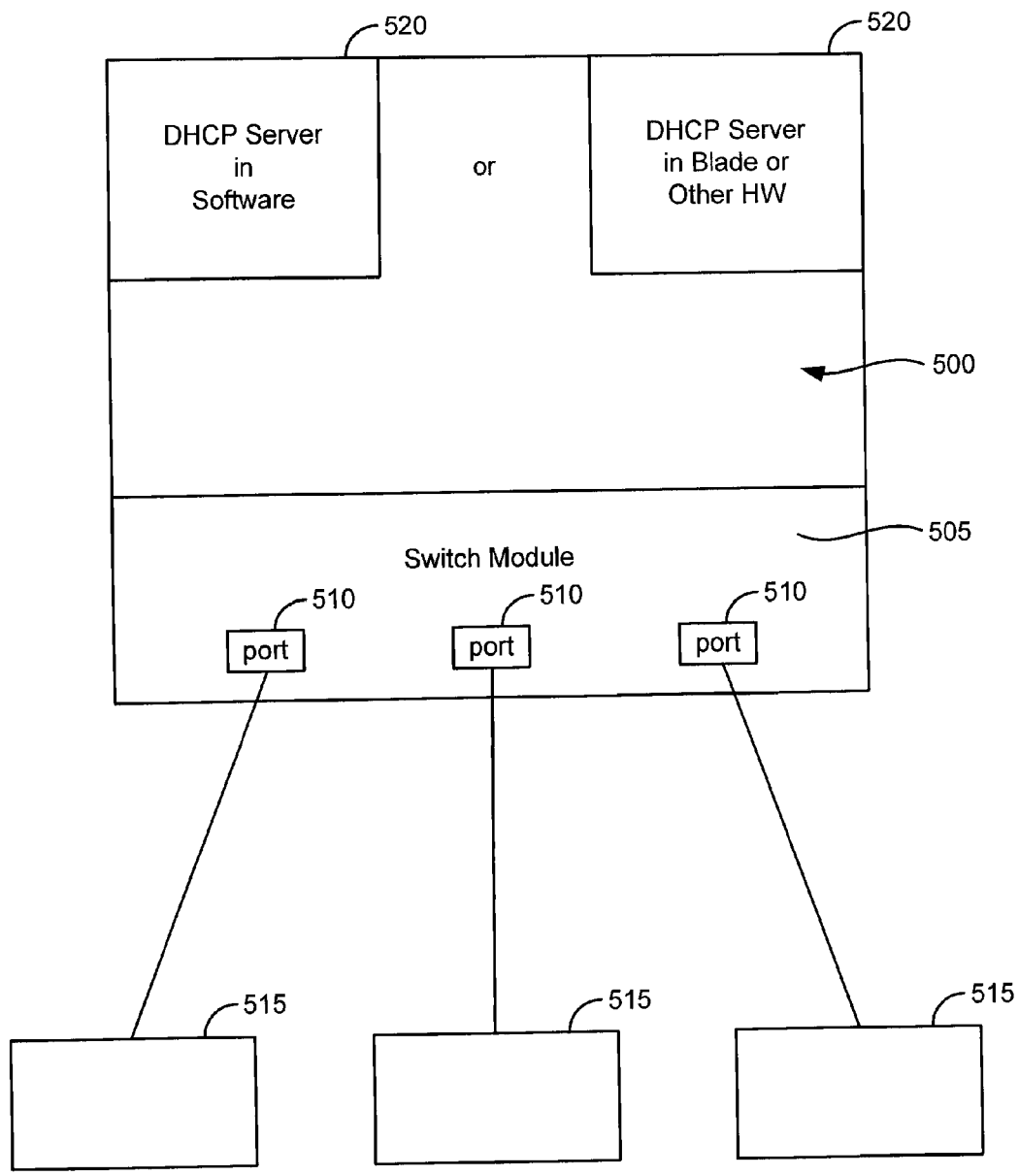
FIG. 5 is a block diagram that illustrates a network device for implementing some aspects of the invention.

However, as illustrated in FIG. 5, some embodiments of the invention combine many of the components necessary to implement the invention within a single chassis. Here, chassis 500 is a router that includes switch module 505, with ports 510 that can be configured for appropriately communicating with devices 515. In this example, router 500 also includes DHCP server 520, which may be implemented in software and/or hardware (e.g., as a line card or "blade"). In alternative implementations, DHCP server 520 could be implemented in a separate device that is in communication with router 500.

Instead of being implemented in a router having a switch module, alternative embodiments of the invention provide a chassis 500 that is a switch that runs Layer 3, running IOS. As above, chassis 500 could also include DHCP server 520, implemented in software and/or hardware, or DHCP server 520 could be implemented in a separate device that is in communication with chassis 500.

It will be appreciated by those of skill in the art that other types of devices, including but not limited to point-of-sale devices (e.g., "cash registers") VoIP telephones and devices used in manufacturing, may be advantageously configured according to the methods of the present invention. For example, one or more defined fields could indicate the type of device, device personality, etc.

In one such example, DHCP Option 60 could indicate that the device is a cash register and DHCP Option 77 could indicate the "personality" of the cash register, e.g., that it is a cash register used by a particular type of restaurant. There could be predefined macros for configuring a switch port appropriately for each type of device, e.g., for a cash register.

Figure 6:
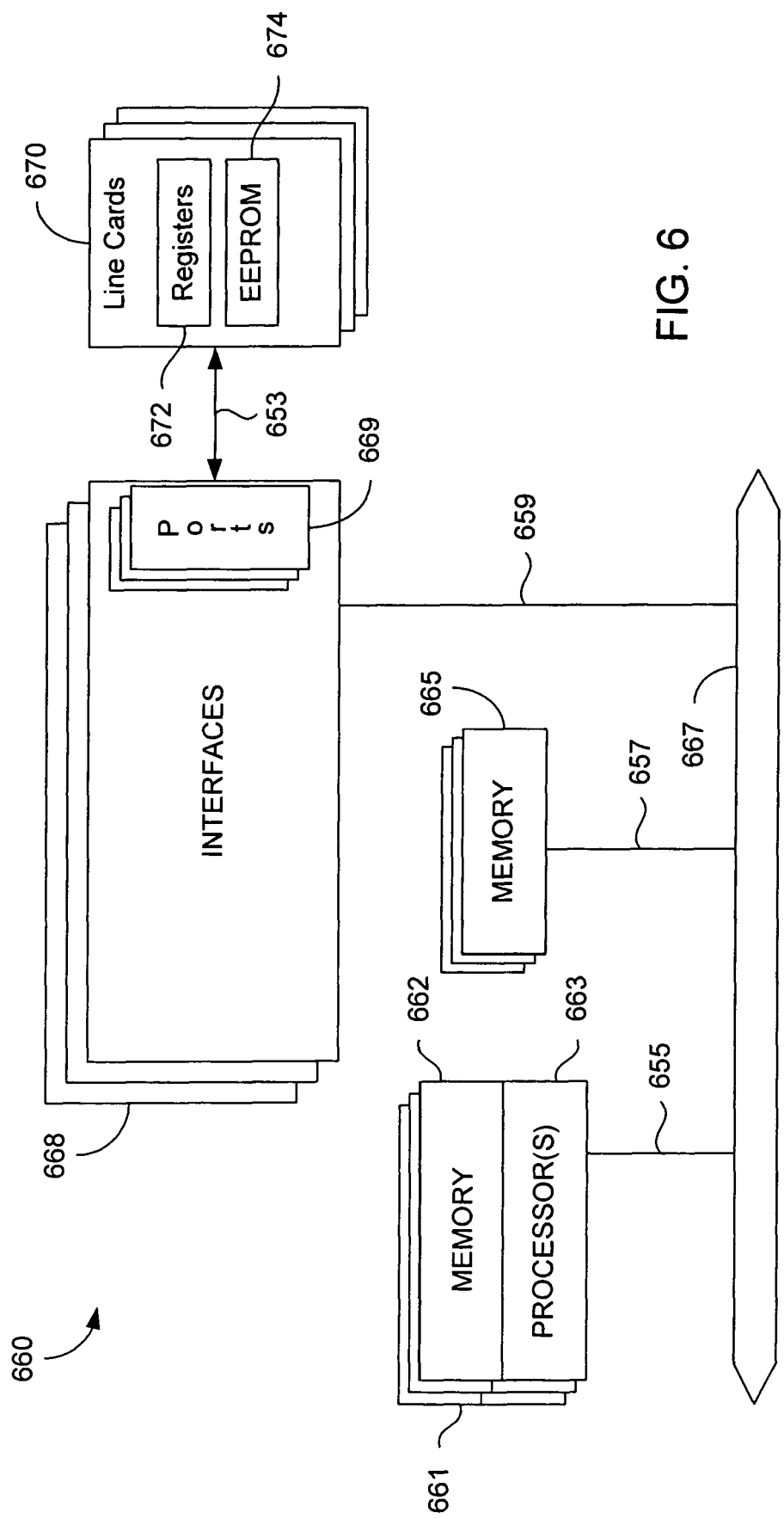
FIG. 6 is a block diagram that illustrates another network device for implementing some aspects of the invention.

FIG. 6 illustrates an example of a network device that may be configured to implement some methods of the present invention. Network device 660 includes a master central processing unit (CPU) 662, interfaces 668, and a bus 667 (e.g., a PCI bus). Generally, interfaces 668 include ports 669 appropriate for communication with the appropriate media.

The interfaces 668 are typically provided as interface cards (sometimes referred to as "line cards" or network interface cards (NICs)) 670. Generally, line cards 670 control the sending and receiving of data packets over the network and sometimes support other peripherals used with the network device 660. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

In some embodiments, one or more of line cards 670 includes at least one independent processor 674 and, in some instances, volatile RAM. Independent processors 674 may be, for example ASICs or any other appropriate processors. According to some such embodiments, these independent processors 674 perform at least some of the functions of the logic described herein. In some embodiments, one or more of interfaces 668 control such communications-intensive tasks as media control and management. By providing separate processors for the communications-intensive tasks, line cards allow the master microprocessor 662 efficiently to perform other functions such as routing computations, network diagnostics, security functions, etc.

When acting under the control of appropriate software or firmware, in some implementations of the invention CPU 662 may be responsible for implementing specific functions associated with the functions of a desired network device. According to some embodiments, CPU 662 accomplishes all these functions under the control of software including an operating system (e.g. Linux, VxWorks, etc.), and any appropriate applications software.

CPU 662 may include one or more processors 663 such as a processor from the Motorola family of microprocessors or the MIPS family of microprocessors. In an alternative embodiment, processor 663 is specially designed hardware for controlling the operations of network device 660. In a specific embodiment, a memory 661 (such as non-volatile RAM and/or ROM) also forms part of CPU 662. However, there are many different ways in which memory could be coupled to the system. Memory block 661 may be used for a variety of purposes such as, for example, caching and/or storing data, programming instructions, etc.

Regardless of network device's configuration, it may employ one or more memories or memory modules (such as, for example, memory block 665) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 6 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 6) or switch fabric based (such as a cross-bar).

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. A method for establishing network device port settings, the method comprising:
   receiving a DHCPDISCOVER request from a first device by a second device;
   examining at least one DHCP option of the DHCPDISCOVER request;
   determining by the second device, based on a device type or vendor identifier specified in the at least one DHCP option in the DHCPDISCOVER request, whether an appropriate macro is available to configure a port of the second device on which the DHCPDISCOVER request was received; and, if the appropriate macro is determined to be available,
   causing by the second device the port of the second device to be configured by applying the appropriate macro.

2. The method as recited in claim 1, further comprising the step of determining whether the port has already been configured in a manner appropriate for the first device.

3. The method as recited in claim 1, wherein the determining step further comprises determining a personality of the first device, and wherein causing by the second device the, port of the second device to be configured by applying the appropriate macro includes applying a macro associated with the personality of the first device and at least one of the device type or vendor identifier.

4. The method as recited in claim 1, wherein the determining step comprises:
   identifying by the second device a device type of the first device from the device type
specified in the at least one DHCP option of the DHCPDTSCOVER request; and
   determining by the second device whether a macro corresponding to the device type of
the first device is stored in a memory of the second device.

5. The method as recited in claim 1, wherein the determining step is performed by the second device.

6. The method as recited in claim 1, wherein the determining step is not performed by the second device.

7. The method as recited in claim 1, wherein the second device
   comprises a switch port and wherein the determining step is performed by one of a DHCP server, an edge services management sewer, an authentication server or a device dedicated to port configuration.

8. The method as recited in claim 1, wherein the network device is a router or switch.

9. The method as recited in claim 1, wherein determining by the second device, based on information in the DHCPDISCOVER request, whether an appropriate macro is available to configure a port of the second device an which the DHCPDISCOVER request was received comprises:
   determining whether a mama corresponding to an RFID device corresponding to the device type is stored in a memory of the second device.

10. The method as recited in claim 1, further comprising: wherein determining by the second device, based on information in the DHCPDISCOVER request, whether an appropriate macro is available to configure a port of the second device on which the DHCPDISCOVER request was received comprises:
   determining whether a macro corresponding to an identified connection type between the first device and the second device is stored in a memory of the second device.

11. The method as recited in claim 1, wherein the DHCPDISCOVER request is not solicited by the second network device.

12. An apparatus for establishing network device port settings, the apparatus comprising:
   a port for receiving a DHCPDISCOVER request form a first device;
   a memory; and
   at least one logic device configured for:
   examining at least one DHCP option of the DHCPDTSCOVER request determining, based on a device type or vendor identifier specified in the at least one DHCP option in the DHCPDISCOVER request, whether an appropriate macro is available to configure the port on which the DHCPDISCOVER request was received:
   and, if the appropriate macro is determined to be available,
   causing the port on which the DHCPDISCOVER request was received to be configured by applying the appropriate macro.

13. The apparatus as recited in claim 12, wherein the first device is a switch on which the DHCPDISCQVER request was first received or a DHCP server.

14. The apparatus as recited in claim 12, wherein the logic device is further configured to forward a copy of the DHCPDTSCOVER request to a second device and wherein the logic device configures the port according to instructions received from the second device.

15. The network device apparatus as recited in claim 12, wherein the apparatus is a switch or router.

16. The as recited in claim 14, wherein the second device is a device selected from the group consisting of a DHCP server, an edge services management server, an authentication server and a device dedicated to port configuration.

17. A non-transitory computer-readable storage medium storing thereon instructions for establishing network device port settings, comprising:
   instructions for examining at least one DHCP option of a DHCPDISCOVER request received from a first device by a second device;
   instructions for determining by the second device, based on a device type or vendor identifier specified in at least one DHCP option in the DHCPDISCOVER request, whether an appropriate macro is available to configure a pod of the second device on which the DHCPDIS-COVER request was received; and instructions or causing by the second device the port of the second device to be configured by applying the appropriate macro, if the appropriate macro is determined to be available.

18. The non-transitory computer-readable medium as recited in claim 17, further comprising:

instructions for determining whether the port has already been configured in a manner appropriate for the first device.

19. The non-transitory computer-readable medium as recited in claim 17, further comprising:

instructions for determining a personality of the first device;

wherein the instructions for causing by the second device the port of the second device to be configured by applying the appropriate macro includes applying a macro associated with the personality of the first device and at least one of the device type or vendor identifier.

20. The non-transitory computer-readable medium as recited in claim 17, further comprising:

instructions fur identifying by the second device type of the first device from the device type specified in the at least one DHCP option of the DHCPDTSCOVER request; and instructions for determining by the second device whether a macro corresponding to the device type of the first device is stored in a memory of the second device.

* * * * *